(12) United States Patent
Zhao et al.

(10) Patent No.: US 12,247,592 B2
(45) Date of Patent: Mar. 11, 2025

(54) POWER SYSTEM AND TRAVEL POWER STATION

(71) Applicant: EPIROC (NANJING) CONSTRUCTION & MINING EQUIPMENT LTD., Nanjing (CN)

(72) Inventors: Jie Zhao, Nanjing (CN); Jiawei Han, Nanjing (CN); Min Yang, Nanjing (CN); Guangbin Tan, Nanjing (CN); Shaozhong Wang, Nanjing (CN); Chengyun Zhu, Nanjing (CN); Buyan Tang, Nanjing (CN); Xiangwei Zhao, Nanjing (CN); Shanfei Feng, Nanjing (CN); Honghao Cai, Nanjing (CN)

(73) Assignee: Epiroc (Nanjing) Construction & Mining Equipment Ltd., Nanjing (CN)

( * ) Notice: Subject to any disclaimer, the term of this patent is extended or adjusted under 35 U.S.C. 154(b) by 0 days.

(21) Appl. No.: 18/292,710

(22) PCT Filed: Jul. 19, 2022

(86) PCT No.: PCT/CN2022/106443
§ 371 (c)(1),
(2) Date: Jan. 26, 2024

(87) PCT Pub. No.: WO2023/005732
PCT Pub. Date: Feb. 2, 2023

(65) Prior Publication Data
US 2024/0369079 A1 Nov. 7, 2024

(30) Foreign Application Priority Data

Jul. 28, 2021 (CN) .......................... 202110867574.9

(51) Int. Cl.
F15B 13/04 (2006.01)
F15B 21/0423 (2019.01)

(52) U.S. Cl.
CPC ...... F15B 13/0401 (2013.01); F15B 21/0423 (2019.01); F15B 2013/041 (2013.01)

(58) Field of Classification Search
CPC ............. F15B 13/0401; F15B 21/0423; F15B 2013/041
See application file for complete search history.

(56) References Cited

FOREIGN PATENT DOCUMENTS

CN 112901567 A 6/2021
CN 113027836 A 6/2021
(Continued)

OTHER PUBLICATIONS

International Search Report dated Oct. 10, 2022 for International Application No. PCT /CN2022/106443.

Primary Examiner — Abiy Teka

(57) ABSTRACT

The present invention discloses a power system and a traveling power station, and belongs to the technical field of engineering machinery. The power system includes a first main pump, a second main pump, an auxiliary pump, a first switching unit, a first logical unit, a second logical unit, and a control system. The auxiliary pump is connected to the first switching unit. A first traveling motor is connected to the first logical unit. A second traveling motor is connected to the second logical unit. The control system is connected to the first switching unit, the first main pump, the second main pump, and the auxiliary pump. According to the present invention, the hydraulic power can be provided to transfer the drill rig, to ensure simplicity in operation and reduce risks and costs.

15 Claims, 3 Drawing Sheets

(56) References Cited

FOREIGN PATENT DOCUMENTS

| | | | | |
|---|---|---|---|---|
| CN | 113027840 | A | 6/2021 | |
| CN | 113027871 | A | 6/2021 | |
| CN | 213869693 | U * | 8/2021 | ........... E21B 19/084 |
| CN | 113417903 | A | 9/2021 | |
| CN | 214698555 | U * | 11/2021 | .............. F15B 11/17 |
| CN | 215171175 | U | 12/2021 | |
| CN | 215761482 | U * | 2/2022 | |
| DE | 102016217959 | A1 | 3/2018 | |
| JP | 2001002371 | A | 1/2001 | |
| JP | 2008169912 | A | 7/2008 | |

\* cited by examiner

POWER SYSTEM AND TRAVEL POWER STATION

TECHNICAL FIELD

The present invention belongs to the technical field of engineering machinery, and in particular to a power system and a traveling power station.

BACKGROUND

An electric drill rig for an open-pit mine is generally used for drilling a blast hole in a large open-pit mine. The electric drill rig is powered by high-voltage electricity above 6,000 volts. At a mining site, a large number of high-voltage poles and high-voltage electrical interfaces need to be laid along various layers of drilling platforms around a mine pit, to provide the high-voltage electricity for the electric drill rig. When the electric drill rig operates on a drilling platform, a high-voltage cable at the tail is connected to the high-voltage electrical interface on the high-voltage pole. When the electric drill rig needs to be transferred to a next platform for operation or there is another long-distance transfer requirement, the electric drill rig needs to be transferred. However, a length of the high-voltage cable is limited. When the electric drill rig is transferred, due to the limited length of the high-voltage cable on the drill rig, the drill rig needs to be stopped and connected to another high-voltage electrical interface after traveling for a period of time. This process is repeated, resulting in low efficiency. In addition, it is extremely dangerous to frequently disconnect and connect high-voltage electrical interfaces. In addition, the high-voltage cable is heavy, and during transferring to another high-voltage electrical interface, the high-voltage cable needs to be manually moved, which is time-consuming and laborious. Moreover, mobile power cars are used to provide the high-voltage electricity for drill rigs in some mines, traveling with the drill rigs and sending the drill rigs to new working platforms. The disadvantage is that the power cars cost a lot.

SUMMARY

Technical Problem

For the problems occurring in a long-distance transfer process of an electric drill rig, the present invention provides a power system and a traveling power station based on the system, to provide hydraulic power for the drill rig during transferring of the drill rig to improve efficiency and reduce risks and costs.

Technical Solutions

According to an aspect, the present invention provides a power system, configured to provide hydraulic power for a drill rig. A first traveling motor, a second traveling motor, a drill rig multi-way valve, and a plurality of drill rig auxiliary execution mechanisms are arranged on the drill rig. The power system includes a first main pump, a second main pump, an auxiliary pump, a first switching unit, a first logical unit, a second logical unit, and a control system. The auxiliary pump is connected to the first switching unit. The first traveling motor is connected to the first logical unit. The second traveling motor is connected to the second logical unit. The control system is connected to the first switching unit, the first main pump, the second main pump, and the auxiliary pump.

When the hydraulic power is provided for the drill rig, the first main pump is connected to the first logical unit, the second main pump is connected to the second logical unit, the first logical unit and the second logical unit are separately controlled by the first switching unit to disconnect a hydraulic oil line of the drill rig from the first traveling motor and the second traveling motor and connect an oil line between the first main pump and the first traveling motor and an oil line between the second main pump and the second traveling motor, the first traveling motor is driven by the first main pump to work, and the second traveling motor is driven by the second main pump to work.

Further, the power system further includes an assistance pump, a second switching unit, and a third logical unit. The assistance pump is connected to the second switching unit. Both the assistance pump and the second switching unit are connected to the control system. The third logical unit is connected to the drill rig multi-way valve. When assistance hydraulic power is provided for the drill rig, the second switching unit is connected to the third logical unit.

Further, the power system further includes a fan pump, a fan motor, and a heat dissipater that are connected in sequence. The heat dissipater is connected to the third logical unit.

Further, the power system includes three working modes: a traveling mode, an assistance mode, and a standby mode. In the traveling mode, the power system drives the first traveling motor and the second traveling motor to work to provide traveling power for the drill rig.

In the assistance mode, the power system provides power for the drill rig auxiliary execution mechanism of the drill rig.

In the standby mode, the power system outputs no hydraulic power externally.

Further, when the power system is in the traveling mode, the first switching unit is on, the second switching unit is off, the first logical unit and the second logical unit operate to disconnect oil lines between a hydraulic system of the drill rig and the first traveling motor and the second traveling motor, connect the oil line between the first main pump and the first traveling motor, and connect the oil line between the second main pump and the second traveling motor, and the power system provides the traveling power for the drill rig.

When the power system is in the assistance mode, the first switching unit is off, the second switching unit is on, both the first logical unit and the second logical unit do not operate, the third logical unit operates, an oil line between the assistance pump and the drill rig multi-way valve is connected, and the power system provides the assistance hydraulic power for the drill rig auxiliary execution mechanism of the drill rig.

When the power system is in the standby mode, both the first switching unit and the second switching unit are off, the first logical unit, the second logical unit, and the third logical unit do not operate, and the fan pump works to drive the fan motor to work to cool hydraulic oil.

Further, the first switching unit includes a logical switching solenoid valve 2041. The logical switching solenoid valve 2041 is a two-position three-way solenoid directional valve. A port A of the logical switching solenoid valve 2041 is connected to the auxiliary pump, and a port P is connected to the first logical unit and the second logical unit. When the port A and the port P are connected, the first switching unit is on.

Further, the second switching unit includes a first directional valve, a second directional valve, and a pilot oil source. The first directional valve is a two-position three-way pilot controlled directional valve. The second directional valve is a solenoid directional valve. A port A of the first directional valve is connected to the auxiliary pump, and a port P is connected to the drill rig multi-way valve. A port A of the second directional valve is connected to a valve element of the first directional valve, and a port P is connected to the pilot oil source.

When the port A and the port P of the second directional valve are connected, and the port A and the port P of the first directional valve are connected, the second switching unit is on.

Further, the control system includes an operating element, a display element, and a control element. The control element is connected to the first switching unit and the second switching unit. Both the display element and the operating element are connected to the control element.

Further, the operating element is a wireless handle. The wireless handle is in wireless connection to the control element.

Further, the power system further includes an approaching apparatus. The approaching apparatus is connected to the control system.

According to another aspect, the present invention provides a traveling power station, including the power system.

Compared with the prior art, in the present invention, when the drill rig needs to be transferred, after the power system in embodiments of the present invention is connected to the drill rig, the control system controls the first main pump, the second main pump, and the auxiliary pump to work, and controls the first switching unit to perform switching control to connect oil lines between the auxiliary pump and the first logical unit and the second logical unit. After hydraulic oil discharged by the auxiliary pump arrives at the first logical unit and the second logical unit, the first logical unit is controlled to disconnect a first drill rig main oil line of the drill rig from the first traveling motor, meanwhile, the oil line between the first main pump and the first traveling motor is connected, and the hydraulic oil discharged by the first main pump enters the first traveling motor, to drive the first traveling motor to work. Similarly, the second logical unit is controlled to disconnect a second drill rig main oil line of the drill rig from the second traveling motor, meanwhile, the oil line between the second main pump 202 and the second traveling motor is connected, and the hydraulic oil discharged by the second main pump 202 enters the second traveling motor, to drive the second traveling motor 102 to work. Therefore, providing the hydraulic power to transfer the drill rig with the power system provided in the present invention saves time and labor. In addition, a position of a cable connection point does not need to be changed to repeatedly connect a cable, so that operation efficiency is greatly improved, and risks are reduced. Moreover, in the present invention, the hydraulic power is used, which is lower in cost than electric power.

Figure 1:
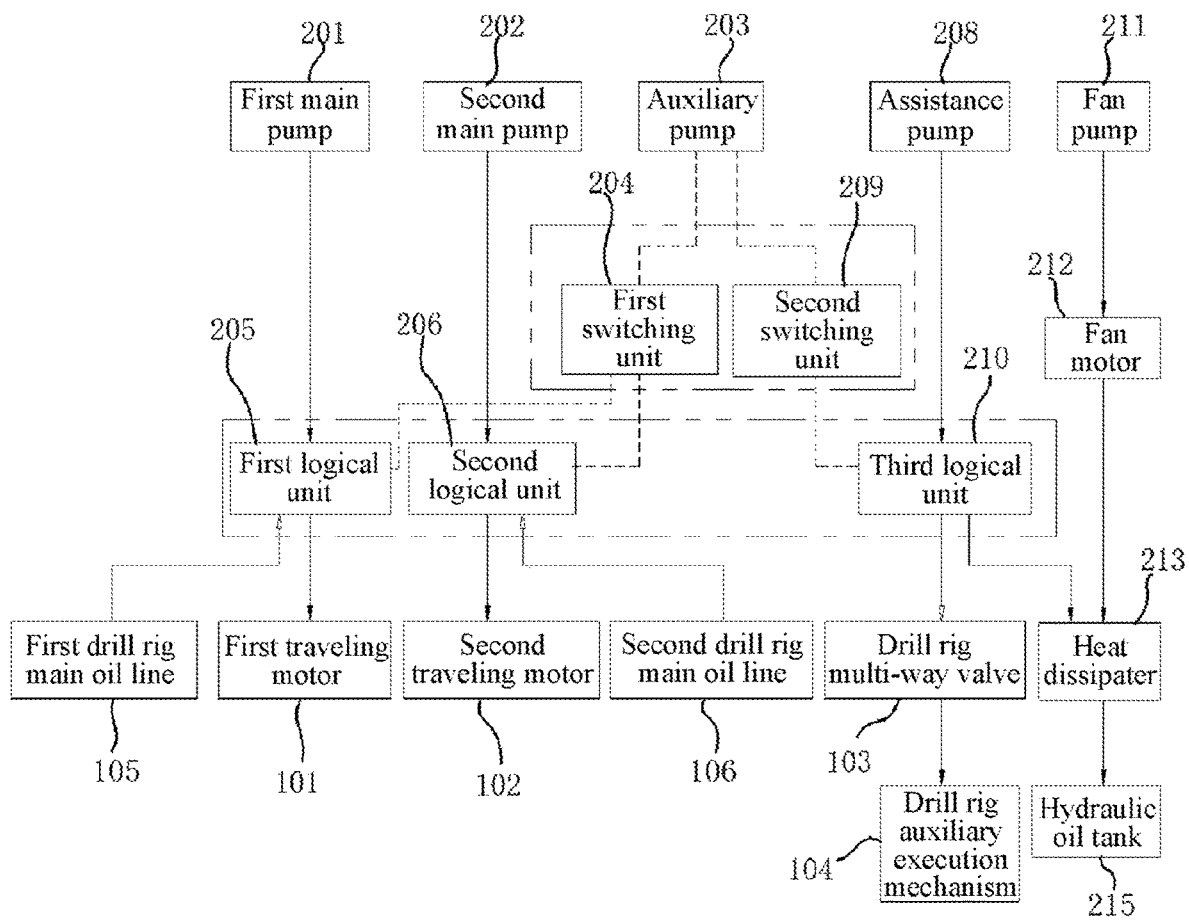
FIG. 1 is a system block diagram of a power system according to an embodiment of the present invention.

In the figures: 100: drill rig; 101: first traveling motor; 102: second traveling motor; 103: drill rig multi-way valve; 104: drill rig auxiliary execution mechanism; 105: first drill rig main oil line; 106: first drill rig main oil line; 201: first main pump; 202: second main pump; 203: auxiliary pump; 204: first switching unit; 2041: logical switching solenoid valve; 205: first logical unit; 206: second logical unit; 207: control system; 2071: operating element; 2072: display element; 2073: control element; 208: assistance pump; 209: second switching unit; 2091: first directional valve; 2092: second directional valve; 2093: pilot oil source; 210: third logical unit; 211: fan pump; 212: fan motor; 213: heat dissipater; 214: approaching apparatus; and 215: hydraulic oil tank.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. The following description of at least one exemplary embodiment is merely illustrative and definitely is not construed as any limitation on the present invention and application or use of the present invention. All other embodiments obtained by a person of ordinary skill in the art based on the embodiments in the present invention without creative efforts shall fall within the protection scope of the present invention.

It should be noted that similar reference signs and letters represent similar items in the following accompanying drawings, and thus a specific item, once defined in one accompanying drawing, does not need to be further discussed in subsequent accompanying drawings.

In addition, terms "first", "second", and the like are merely for ease of description and cannot be understood as a limitation on the quantity and the like. Moreover, a word "connection" may represent "mechanical connection", "electric connection", "signal connection", or the like, determined by a specific situation.

A power system in the present invention is mainly for a large electric drill rig for blast holes, and provides hydraulic power for a traveling motor of the drill rig, to implement long-distance transferring of the drill rig without a power source (for example, the electric drill rig is disconnected from a power supply, or an engine or a hydraulic component of the drill rig fails) A first traveling motor 101, a second traveling motor 102, a drill rig multi-way valve 103, and a plurality of drill rig auxiliary execution mechanisms 104 are arranged on a drill rig 100. The first traveling motor 101 and the second traveling motor 102 are configured to provide the hydraulic power for a crawler of the drill rig. The drill rig multi-way valve 103 is mainly configured to control a hydraulic system of the drill rig, and control how a hydraulic oil line of the drill rig works. The drill rig auxiliary execution mechanism 104 includes an outrigger mechanism and the like on the drill rig 100, and includes a plurality of hydraulic motors and hydraulic cylinders.

Figure 2:
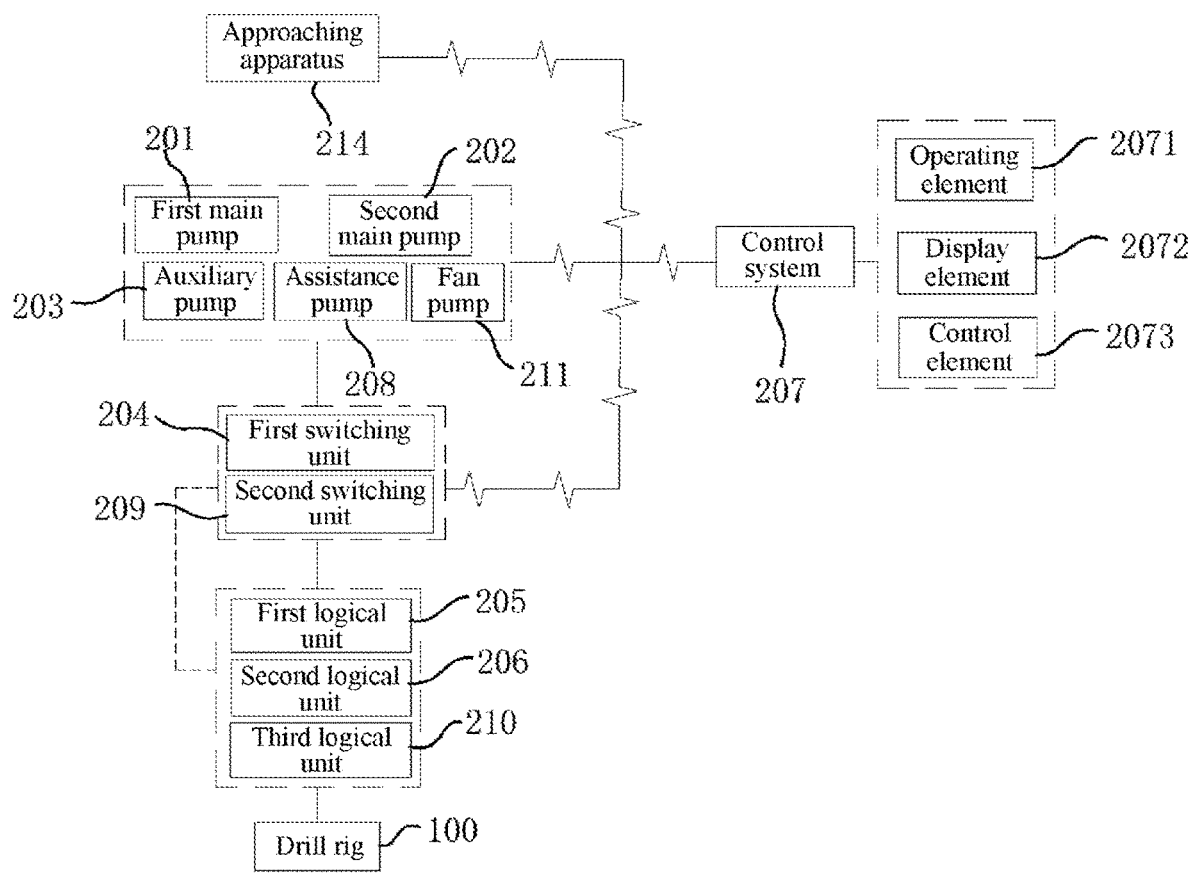
FIG. 2 is a connection block diagram of a control system according to an embodiment of the present invention.

FIG. 1 is a system block diagram of the power system according to an embodiment of the present invention. FIG. 2 is a connection block diagram of a control system according to an embodiment of the present invention. As shown in FIG. 1 and FIG. 2, the power system includes a first main pump 201, a second main pump 202, an auxiliary pump 203, a first switching unit 204, a first logical unit 205, a second logical unit 206, and a control system 207. The auxiliary pump 203 is connected to the first switching unit 204. The first traveling motor 101 is connected to the first logical unit 205. The second traveling motor 102 is connected to the second logical unit 206. The control system 207 is connected to the first switching unit 204, the first main pump 201, the second main pump 202, and the auxiliary pump 203. When the hydraulic power is provided for the drill rig 100, the first main pump 201 is connected to the first logical unit 205, the second main pump 202 is connected to the second logical unit 206, the first logical unit 205 and the second logical unit 206 are separately controlled by the first switching unit 204 to disconnect a hydraulic oil line of the drill rig 100 from the first traveling motor 101 and the second traveling motor 102 and connect an oil line between the first main pump 201 and the first traveling motor 101 and an oil line between the second main pump 202 and the second traveling motor 102, the first traveling motor 101 is driven by the first main pump to work, and the second traveling motor 102 is driven by the second main pump 202 to work.

When the drill rig needs to be transferred, after the power system in the embodiment of the present invention is connected to the drill rig, the control system controls the first main pump 201, the second main pump 202, and the auxiliary pump 203 to work, and controls the first switching unit 204 to perform switching control to connect oil lines between the auxiliary pump 203 and the first logical unit 205 and the second logical unit 206. After hydraulic oil discharged by the auxiliary pump arrives at the first logical unit 205 and the second logical unit 206, the first logical unit 205 is controlled to disconnect a first drill rig main oil line 105 of the drill rig from the first traveling motor 101, meanwhile, the oil line between the first main pump 201 and the first traveling motor 101 is connected, and the hydraulic oil discharged by the first main pump 201 enters the first traveling motor, to drive the first traveling motor 101 to work. Similarly, the second logical unit 206 is controlled to disconnect a second drill rig main oil line 106 of the drill rig from the second traveling motor 102, meanwhile, the oil line between the second main pump 202 and the second traveling motor 102 is connected, and the hydraulic oil discharged by the second main pump 202 enters the second traveling motor, to drive the second traveling motor 102 to work. Therefore, providing the hydraulic power to transfer the drill rig with the power system provided in the present invention saves time and labor. In addition, a position of a cable connection point does not need to be changed to repeatedly connect a cable, so that operation efficiency is greatly improved, and risks are reduced. Moreover, in the present invention, the hydraulic power is used, which is lower in cost than electric power.

Figure 3:
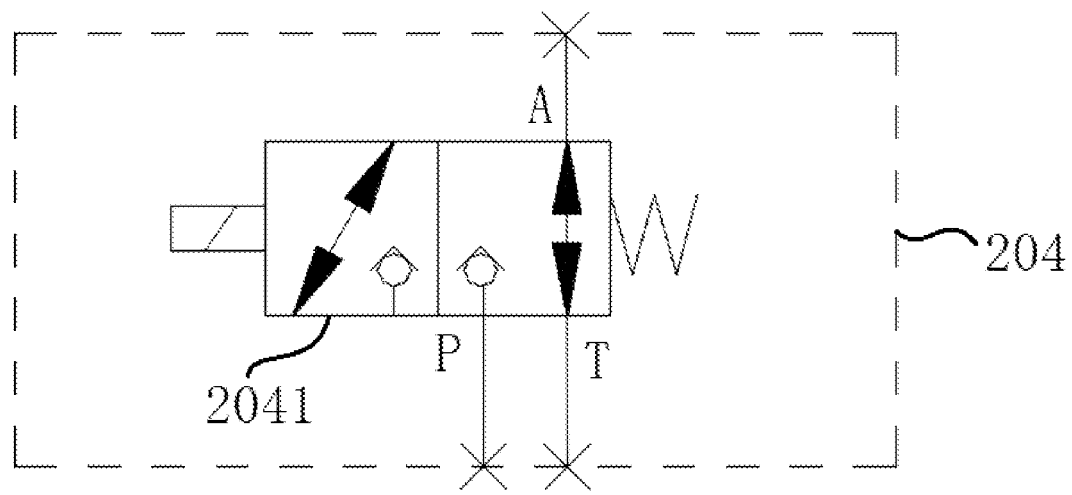
FIG. 3 is a schematic diagram of a first switching unit according to an embodiment of the present invention.

In an embodiment of the present invention, the first switching unit 204 includes a logical switching solenoid valve 2041. The logical switching solenoid valve 2041 is a two-position three-way solenoid directional valve. As shown in FIG. 3, a port A of the logical switching solenoid valve 2041 is connected to the auxiliary pump 203, and a port P is connected to the first logical unit 205 and the second logical unit 206. When the port A and the port P are connected, the first switching unit 204 is on; and when the port A and a port T are connected, the first switching unit is off. The control system 207 controls the logical switching solenoid valve 2041 to perform switching control, so that whether the hydraulic oil discharged by the auxiliary pump 203 can enter the first logical unit 205 and the second logical unit 206 may be controlled by the first switching unit 204.

In an embodiment of the present invention, the first logical unit 205 and the second logical unit 206 are logical valves, and any commercially available logical valve can implement a corresponding function.

Further, in an embodiment of the present invention, the provided power system not only can provide the hydraulic power to transfer the drill rig, but also can provide temporary hydraulic power for the drill rig in an emergency, for example, in a case of a power failure, a motor failure, or an engine failure, to assist the drill rig. The power system provides the hydraulic power for the drill rig auxiliary execution mechanism 104 of the drill rig, to implement emergency assistance on the drill rig. Therefore, to implement assistance, in an embodiment of the present invention, the power system further includes an assistance pump 208, a second switching unit 209, and a third logical unit 210. The assistance pump 208 is connected to the second switching unit 209. Both the assistance pump 208 and the second switching unit 209 are connected to the control system 207. The third logical unit 210 is connected to the drill rig multi-way valve 103. When assistance hydraulic power is provided for the drill rig 100, the second switching unit 209 is connected to the third logical unit 210.

When the assistance hydraulic power needs to be provided for the drill rig, after the power system is connected to the drill rig, the control system 207 controls the auxiliary pump 203 to work, and controls the second switching unit 209 to perform oil line switching, so that the hydraulic oil discharged by the auxiliary pump enters the third logical unit 210. Then, the third logical unit 210 controls a hydraulic oil line between the auxiliary pump 203 and the drill rig multi-way valve 103 to be connected. Then, the hydraulic oil enters the drill rig auxiliary execution mechanism 104 through the drill rig multi-way valve 103, to drive the drill rig auxiliary execution mechanism 104 to work, to assist the drill rig.

The power system inevitably generates heat in a working process, resulting in a rise of an oil temperature of the hydraulic oil. Therefore, in an embodiment of the present invention, the power system further includes a fan pump 211, a fan motor 212, and a heat dissipater 213 that are connected in sequence. The heat dissipater 213 is connected to the third logical unit 210.

When the power system does not need to provide hydraulic power externally, heat dissipation is performed on the hydraulic oil. In a heat dissipation process, heat dissipation may be performed on the hydraulic oil through two oil lines. On one oil line, the fan pump 211 sucks in the hydraulic oil in a hydraulic oil tank 215, and then discharges the hydraulic oil to the fan motor 212, the fan motor 212 works to drive a fan to operate for rapid heat dissipation, and then the hydraulic oil enters the heat dissipater 213, and after heat dissipation, returns the hydraulic oil tank 215. On the other oil line, the auxiliary pump 203 sucks the hydraulic oil from the hydraulic oil tank 215, and discharges the hydraulic oil, and the hydraulic oil enters the heat dissipater 213 through the second switching unit 209 and the third logical unit 210, and after heat dissipation, flows into the hydraulic oil tank 215. Therefore, through the two heat dissipation lines, the power system of the present invention has better heat dissipation effects, and damage caused by heating to the system is avoided.

Figure 4:
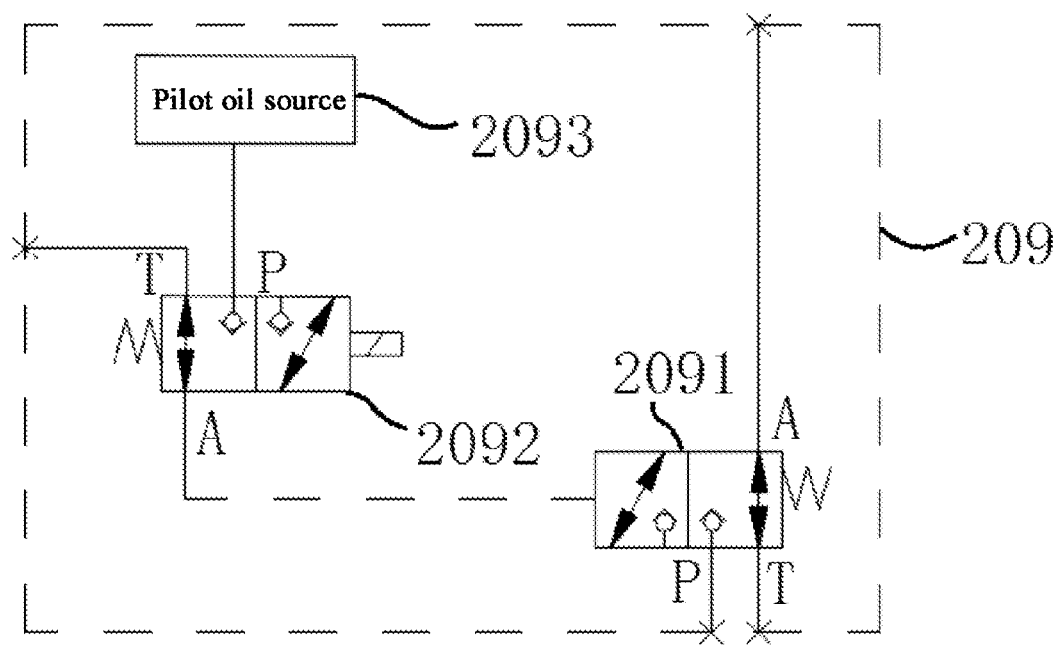
FIG. 4 is a schematic diagram of a second switching unit according to an embodiment of the present invention.

In an embodiment of the present invention, the third logical unit 210 is a logical valve. As shown in FIG. 4, the second switching unit 209 includes a first directional valve 2091, a second directional valve 2092, and a pilot oil source 2093. The first directional valve 2091 is a two-position three-way pilot controlled directional valve. The second directional valve 2092 is a solenoid directional valve. A port A of the first directional valve 2091 is connected to the auxiliary pump 203, and a port P is connected to the drill rig multi-way valve 103. A port A of the second directional valve 2092 is connected to a valve element of the first directional valve 2091, and a port P is connected to the pilot oil source 2093. When the port A and the port P of the second directional valve 2092 are connected, and the port A and the port P of the first directional valve 2091 are connected, the second switching unit 209 is on; and when T ports and the A ports are connected, the second switching unit 209 is off.

The power system in the foregoing embodiment includes three working modes: a traveling mode, an assistance mode, and a standby mode. In the traveling mode, the power system drives the first traveling motor 101 and the second traveling motor 102 to work to provide traveling power for the drill rig 100. In the assistance mode, the power system provides power for the drill rig auxiliary execution mechanism of the drill rig 100. In the standby mode, the power system outputs no hydraulic power externally.

When the power system is in the traveling mode, the first switching unit 204 is on, the second switching unit 209 is off, the first logical unit 205 and the second logical unit 206 operate to disconnect oil lines between a hydraulic system of the drill rig and the first traveling motor 101 and the second traveling motor 102, connect the oil line between the first main pump 201 and the first traveling motor 101, and connect the oil line between the second main pump 202 and the second traveling motor 102, and the power system provides the traveling power for the drill rig 100. When the power system is in the assistance mode, the first switching unit 204 is off, the second switching unit 209 is on, both the first logical unit 205 and the second logical unit 206 do not operate, the third logical unit 210 operates, an oil line between the assistance pump 208 and the drill rig multi-way valve 103 is connected, and the power system provides the assistance hydraulic power for the drill rig auxiliary execution mechanism 104 of the drill rig 100. When the power system is in the standby mode, both the first switching unit 204 and the second switching unit 209 are off, the first logical unit 205, the second logical unit 206, and the third logical unit 210 do not operate, and the fan pump 211 works to drive the fan motor 212 to work to cool hydraulic oil.

Therefore, the power system provided in the embodiment of the present invention may be switched in the three modes to provide the hydraulic power for transferring and emergency assistance of the drill rig, which saves time and labor and can reduce risks and costs.

In an embodiment of the present invention, the control system 207 includes an operating element 2071, a display element 2072, and a control element 2073. The control element 2073 is connected to the first switching unit 204 and the second switching unit 209. Both the display element 2072 and the operating element 2071 are connected to the control element 2073.

The control element 2073 is an existing controller, for example, a programmable logic controller (PLC) or a control card. The display element 2072 is a display. If the display element 2072 is a touchscreen or a display with a button, then at this time, the display element 2072 may be used as the operating element 2071, that is, the display element 2072 and the operating element 2071 form an integrated device.

In addition, if the display element 2072 is a control and display integrated machine, the operating element 2071, then at this time, the display element 2072, and the control element 2073 form an integrated device. In an embodiment of the present invention, the operating element 2071 is a wireless handle. The wireless handle may perform wireless communication with the control element 2073 through, for example, Bluetooth, wireless fidelity (Wifi), or Zigbee. Therefore, when the system provides the hydraulic power for the drill rig, remote control may be performed through the wireless handle, which brings more convenience to operation.

Further, in an embodiment of the present invention, for ease of connecting the power system to the drill rig, the system further includes an approaching apparatus 214. The approaching apparatus 214 is an electric capstan. The approaching apparatus is connected to the control system 207. When the hydraulic power needs to be provided for the drill rig, a distance between the power system and the drill rig may be first shortened through the approaching apparatus, to align the drill rig to facilitate connection, so that labor is saved.

In an embodiment of the present invention, a traveling power station is further provided. The traveling power station includes the power system provided in the foregoing embodiment. Specifically, the traveling power station is designed as a vehicle including a frame, a wheel, and the like. Then, the power system in the embodiment of the present invention is mounted to the frame. When the traveling power station is used to provide hydraulic power for a drill rig, the traveling power station may be directly pulled nearby the drill rig. Then, the drill rig and the traveling power station are pulled close to and aligned with each other through the approaching apparatus 214. Then, the traveling power station is connected to the drill rig. Then the traveling power station provides the hydraulic power for transferring or emergency assistance of the drill rig. Convenience is brought, and risks and costs can be reduced.

Hereto, the present invention has been described in detail. Some details known to this art are not described, to avoid the idea of the present invention being obscured. According to the foregoing descriptions, a person skilled in the art may completely know how to implement the technical solutions disclosed herein.

The descriptions of the present invention are given for the sake of example and illustration, and are not exhaustive or limiting the present invention to the disclosed forms. Many modifications and variations are obvious to a person of ordinary skill in the art. The embodiments are selected and described to better explain the principles and the practical application of the present invention, enabling a person of ordinary skill in the art to understand the present invention and design various embodiments with various modifications for specific uses.

What is claimed is:

1. A power system, configured to provide hydraulic power for a drill rig (100), wherein a first traveling motor (101), a second traveling motor (102), a drill rig multi-way valve (103), and a plurality of drill rig auxiliary execution mechanisms (104) are arranged on the drill rig (100); the power system comprises a first main pump (201), a second main pump (202), an auxiliary pump (203), a first switching unit (204), a first logical unit (205), a second logical unit (206), and a control system (207); the auxiliary pump (203) is connected to the first switching unit (204); the first traveling motor (101) is connected to the first logical unit (205), and the second traveling motor (102) is connected to the second logical unit (206); the control system (207) is connected to the first switching unit (204), the first main pump (201), the second main pump (202), and the auxiliary pump (203); and when the hydraulic power is provided for the drill rig (100), the first main pump (201) is connected to the first logical unit (205), the second main pump (202) is connected to the second logical unit (206), the first logical unit (205) and the second logical unit (206) are separately controlled by the first switching unit (204) to disconnect a hydraulic oil line of the drill rig (100) from the first traveling motor (101) and the second traveling motor (102) and connect an oil line between the first main pump (201) and the first traveling motor (101) and an oil line between the second main pump (202) and the second traveling motor (102), the first traveling motor (101) is driven by the first main pump to work, and the second traveling motor (102) is driven by the second main pump (202) to work.

2. The power system according to claim 1, further comprising an assistance pump (208), a second switching unit (209), and a third logical unit (210), wherein the assistance pump (208) is connected to the second switching unit (209), both the assistance pump (208) and the second switching unit (209) are connected to the control system (207), the third logical unit (210) is connected to the drill rig multi-way valve (103), and when assistance hydraulic power is provided for the drill rig (100), the second switching unit (209) is connected to the third logical unit (210).

3. The power system according to claim 2, further comprising a fan pump (211), a fan motor (212), and a heat dissipater (213) that are connected in sequence, wherein the heat dissipater (213) is connected to the third logical unit (210).

4. The power system according to claim 3, comprising three working modes: a traveling mode, an assistance mode, and a standby mode, wherein in the traveling mode, the power system drives the first traveling motor (101) and the second traveling motor (102) to work to provide traveling power for the drill rig (100);

in the assistance mode, the power system provides power for the drill rig auxiliary execution mechanism (104) of the drill rig (100); and in the standby mode, the power system outputs no hydraulic power externally.

5. The power system according to claim 4, wherein when the power system is in the traveling mode, the first switching unit (204) is on, the second switching unit (209) is off, the first logical unit (205) and the second logical unit (206) operate to disconnect oil lines between a hydraulic system of the drill rig (100) and the first traveling motor (101) and the second traveling motor (102), connect the oil line between the first main pump (201) and the first traveling motor (101), and connect the oil line between the second main pump (202) and the second traveling motor (102), and the power system provides the traveling power for the drill rig (100);

when the power system is in the assistance mode, the first switching unit (204) is off, the second switching unit (209) is on, both the first logical unit (205) and the second logical unit (206) do not operate, the third logical unit (210) operates, an oil line between the assistance pump (208) and the drill rig multi-way valve (103) is connected, and the power system provides the assistance hydraulic power for the drill rig auxiliary execution mechanism (104) of the drill rig (100); and when the power system is in the standby mode, both the first switching unit (204) and the second switching unit (209) are off, the first logical unit (205), the second logical unit (206), and the third logical unit (210) do not operate, and the fan pump (211) works to drive the fan motor (212) to work to cool hydraulic oil.

6. The power system according to claim 5, wherein the first switching unit (204) comprises a logical switching solenoid valve 2041, the logical switching solenoid valve 2041 is a two-position three-way solenoid directional valve, a port A of the logical switching solenoid valve 2041 is connected to the auxiliary pump (203), a port P is connected to the first logical unit (205) and the second logical unit (206), and when the port A and the port P are connected, the first switching unit (204) is on.

7. The power system according to claim 5, wherein the second switching unit (209) comprises a first directional valve (2091), a second directional valve (2092), and a pilot oil source (2093); the first directional valve (2091) is a two-position three-way pilot controlled directional valve, and the second directional valve (2092) is a solenoid directional valve; a port A of the first directional valve (2091) is connected to the auxiliary pump (203), and a port P is connected to the drill rig multi-way valve (103); a port A of the second directional valve (2092) is connected to a valve element of the first directional valve (2091), and a port P is connected to the pilot oil source (2093); and when the port A and the port P of the second directional valve (2092) are connected, and the port A and the port P of the first directional valve (2091) are connected, the second switching unit (209) is on.

8. A traveling power station, comprising the power system according to claim 2.

9. The power system according to claim 2, wherein the control system (207) comprises an operating element (2071), a display element (2072), and a control element (2073), the control element (2073) is connected to the first switching unit (204) and the second switching unit (209), and both the display element (2072) and the operating element are connected to the control element (2073).

10. The power system according to claim 9 wherein the operating element (2071) is a wireless handle, and the wireless handle is in wireless connection to the control element (2073).

11. The power system according to claim 10, further comprising an approaching apparatus (214), wherein the approaching apparatus (214) is connected to the control system (207).

12. The power system according to claim 1, wherein the control system (207) comprises an operating element (2071), a display element (2072), and a control element (2073), the control element (2073) is connected to the first switching unit (204) and the second switching unit (209), and both the display element (2072) and the operating element are connected to the control element (2073).

13. The power system according to claim 12, wherein the operating element (2071) is a wireless handle, and the wireless handle is in wireless connection to the control element (2073).

14. The power system according to claim 13, further comprising an approaching apparatus (214), wherein the approaching apparatus (214) is connected to the control system (207).

15. A traveling power station, comprising the power system according to claim 1.

* * * * *